United States Patent [19]

Frisch et al.

[11] 4,372,508

[45] Feb. 8, 1983

[54] DYNAMIC KICKPLATE DEPLOYMENT SYSTEM

[75] Inventors: Georg D. Frisch, Holland; William Ward, Jr., Philadelphia, both of Pa.

[73] Assignee: The United States of America as represented by the Secretary of the Navy, Washington, D.C.

[21] Appl. No.: 244,420

[22] Filed: Mar. 16, 1981

[51] Int. Cl.³ .............................................. B64D 11/06
[52] U.S. Cl. .................................. 244/122 AG; 297/216
[58] Field of Search ................ 244/122 AG, 122 AE, 244/122 A, 122 R; 297/216, 466

[56] References Cited

U.S. PATENT DOCUMENTS

| | | | |
|---|---|---|---|
| 2,953,331 | 9/1960 | Holcomb et al. | 244/122 AG |
| 2,955,786 | 10/1960 | Drew et al. | 244/122 AG |
| 3,645,480 | 2/1972 | Forman | 244/122 AG |
| 4,247,064 | 1/1981 | Schulman et al. | 244/122 AG |

*Primary Examiner*—Charles E. Frankfort
*Assistant Examiner*—Rodney Cori
*Attorney, Agent, or Firm*—R. S. Sciascia; Henry Hansen

[57] ABSTRACT

An aircraft crewman protective system properly positions the lower legs and feet of the crewman during emergency egress from an aircraft. The system includes a pair of plate members connected to swing outward from the under side of the crewman's console at each leg position and means for deploying the plate members at the time of ejection. Upon deployment, the plate members push the feet of the crewman backward guiding the feet and lower legs within a contact-free envelope during ejection without changing desired spinal position of the crewman.

4 Claims, 2 Drawing Figures

4,372,508

DYNAMIC KICKPLATE DEPLOYMENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to emergency aircraft egress systems, and more particularly to a system for guiding the lower legs and feet of a pilot during emergency aircraft egress.

It is well known that a pilot can not bail out of a high speed aircraft but must be ejected therefrom. Such ejection is usually accomplished by ejecting the seat together with its occupant from the stricken aircraft through the use of a catapult and rocket motor. One significant problem to overcome during ejection is injury to the pilot's legs and feet due to direct impact with the various portions of the cockpit, in particular the instrument panel. Therefore, during the catapult phase when the seat and its occupant move upward out of an aircraft, the pilot's lower legs and feet, which are normally extended to operate the rudder pedals, must be guided to prevent physical impact with the aircraft interior structure. It is not realistic to expect the pilot to voluntarily withdraw his legs and feet to assume a safe preejection position because he may be injured or he may be subject to forces so high that he can not assume or maintain that same safe position by his own efforts. Various devices have therefore been proposed for safely positioning the feet and lower legs of an ejection seat occupant at the time of ejection but do not solve the problem as stated above. See for example U.S. Pat. No. 2,953,331, to Holcolm et al., U.S. Pat. No. 2,765,130 to Replogle and U.S. Pat. No. 2,709,557 to Replogle and Majewski.

SUMMARY OF THE INVENTION

Accordingly, it is an object of the present invention to provide controlled guidance of an aviator's lower legs and feet during the catapult phase of emergency egress from aircraft by using direct pressure to the feet, to increase the rate of feet swing-back thus guiding them to prevent direct impact with the instrument panel or other obstruction in the cockpit. It is another object of the invention to provide a simple, and inexpensive reliable feet guidance device having a minimum number of moving parts and readily adaptable for installation into many aircraft. It is a further object to provide for ejection feet guidance while allowing conventional feet restraining devices to more effectively perform their function.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
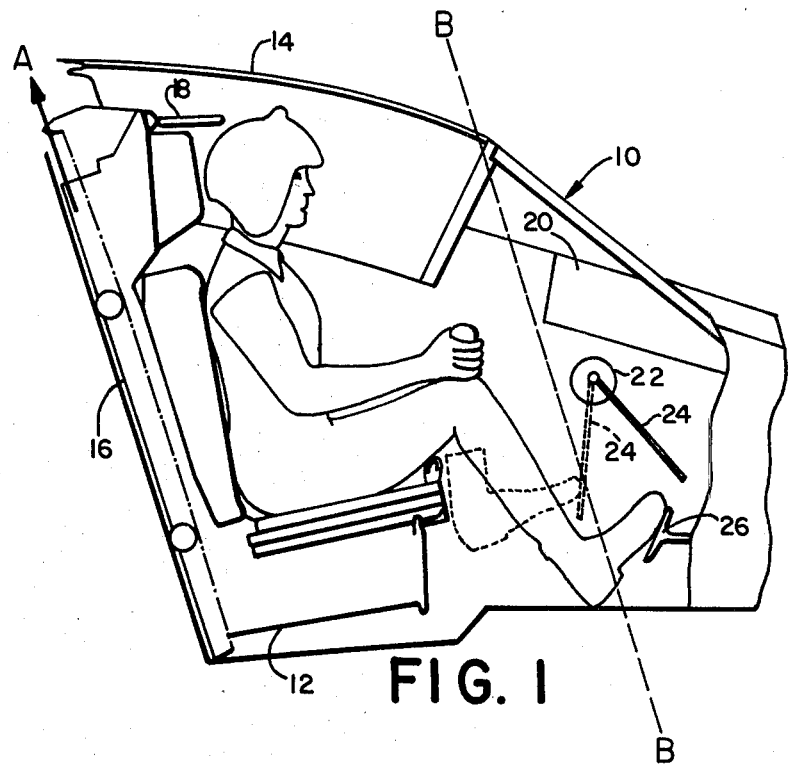
FIG. 1 is a fragmentary side view of the cockpit of an aircraft in which there is installed a leg and foot positioning means of this invention.
Figure 2:
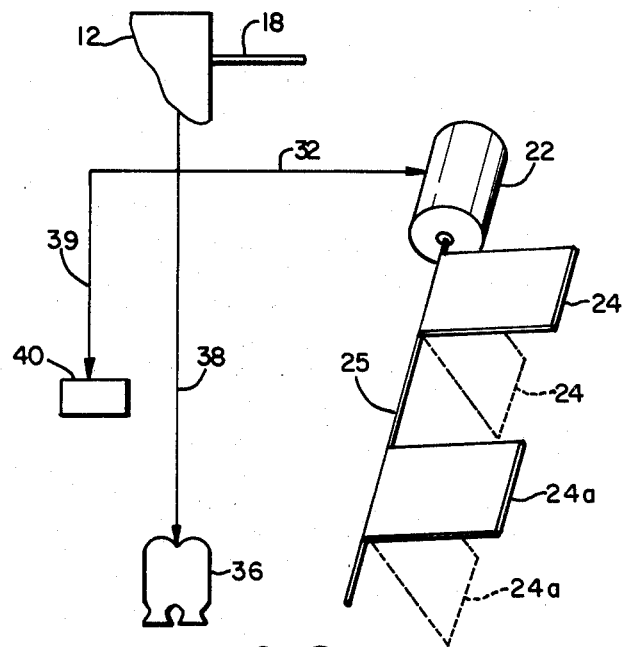
FIG. 2 is a diagrammatic and perspective view of the positioning means and its actuating means of FIG. 1.

Referring now to the drawings, wherein like reference characters designate like or corresponding parts throughout the several views, there is shown in FIG. 1 the cockpit portion of an aircraft 10 that is equipped with an ejection seat 12. The cockpit is enclosed by a canopy 14 used for normal ingress and egress by a pilot and secured in a closed position during flight. For normal opening and closing, the canopy 14 slides back and forth whereas during emergency ejection procedure canopy 14 is adapted to be freed by detonating a conventional release mechanism (not shown) so that it will be quickly carried away by the slip stream. When emergency ejection takes place, initial propulsion of seat 12 is usually effected by a catapult 36 (FIG. 2). During ejection seat 12 is guided in its motion by rails 16 which are inclined rearwardly and upwardly and which are fixed to the aircraft structure. A rotary means 22 is mounted to the aircraft structure under instrument panel 20. Rotary means 22 has a rotatable center shaft 25 extending above rudder pedals 26 parallel to the lateral axis of the aircraft. Attached to shaft 25 are kick plates 24 and 24a each positioned to be aligned with one of the pedals 26 and each configured wider than pedals 26 to insure that contact with the pilot's feet is not avioded when rotary means 22 is activated. Kick plates 24 and 24a are each long enough to make contact with the pilot's feet but not to make contact with the pedals 26. The arc of kick plates 24, 24a is sufficient to guide the pilot's feet from the pedals 26 and assist them to come within the ejection clearance envelope between the planes defined by line A and line B—B as early as possible. During normal flight kick plate 24, 24a are held in a raised position to alleviate obstructing the pilot in any manner. The rotating motion of kick plate 24, 24a when activated, guides the pilot's feet to avoid impact with the instrument panel 20 as seat 12 is ejected rearwardly and upwardly along track 16. Rotary means 22 is connected to receive a signal from ejection initiator 18 through conductor 32 to actuate the rotary means 22, causing shaft 25 to rotate in a clockwise direction. A canopy release 40 is connected to receive the signal from activator 18 simultaneously through conductor 39 to release the canopy 14 into the slip stream. Additionally, catapult 36 through conductor 38 is connected to receive the signal from activator 18 to provide propulsion for the ejection seat 12.

Operation of the foregoing embodiment as an invention is as follows. When ejection becomes necessary the pilot reaches up above his head and pulls activator 18 causing the signal to flow through conductors 32, 38 and 39. This signal causes canopy release 40 to free canopy 14 and activate a catapult 36 causing the ejection of seat 12 and the pilot. Additionally, the signal through conductor 32 activates rotary means 22 causing shaft 25 to rotate in a clockwise direction and kick plates 24 and 24a come in contact with the pilot's feet causing them to move rearwardly as the catapult moves them upwardly to a postion to the left of dotted line B—B as shown in FIG. 1.

Some of the many advantages of the invention should now be readily apparent. For example, a novel guiding means has been provided which is capable of automatically moving a pilot's feet from a normal flight operating position to a withdrawn position safe from impact with the aircraft instrument panel during ejection.

Through the rotational motion of a dynamic kick plate a pilot's feet are automatically removed from the rudder pedals of his aircraft and guided to a position close to his seat where they may be effectively restrained by a conventional leg and feet restrainers.

The system is inexpensive and reliable and can be readily adapted for installation on many different aircraft where the risk of limb impact is prevalent.

Obviously, many modifications and variations of the present invention are possible in light of the above teachings. It is therefore to be understood that within the scope of the appended claims, the invention may be practiced otherwise than as specifically described.

What is claimed is:

1. Apparatus for positioning the feet of a subject from the rudder pedals of an aircraft into the ejection clearance envelope of the aircraft during ejection, said envelope including all the area required for the safe ejection of the subject, comprising:
   actuator means triggered by the pilot for providing an ejection command signal; and
   plate means responsive to said signal pivotally mounted to the aircraft's structure on an axis forward of the envelope and parallel to the lateral axis of the aircraft for urging the feet rearwardly into the envelope.

2. Apparatus according to claim 1 wherein said plate means further comprises:
   a shaft rotatable about said axis;
   a pair of kickplates fixed to said shaft in a forward stowed position for contacting the toe portion of the left and right foot, respectively when rotated rearwardly; and
   a motor connected to receive said signal and drivingly connected to rotate rearwardly said shaft.

3. Apparatus as recited in claim 2, wherein said actuator means further comprises:
   a handle mounted in the aircraft and activated by the pilot for initiating the signal flow;
   a power source connected to said handle for producing the signal; and
   a conductor connected between said power source and said plate means for carrying the signal thereto.

4. Apparatus according to claim 2 wherein said kickplates are laterally positioned along said shaft above respective ones of the rudder pedals, and the angle of rotation of said kickplates circumscribes the position of said pedals along the length of the aircraft.

* * * * *